(12) United States Patent
Zhong

(10) Patent No.: US 10,944,805 B1
(45) Date of Patent: Mar. 9, 2021

(54) SCALABLE MULTI-LEVEL COLLABORATIVE CONTENT MODERATION

(71) Applicant: Agora Lab, Inc., Santa Clara, CA (US)

(72) Inventor: Sheng Zhong, Santa Clara, CA (US)

(73) Assignee: Agora Lab, Inc., Santa Clara, CA (US)

( * ) Notice: Subject to any disclaimer, the term of this patent is extended or adjusted under 35 U.S.C. 154(b) by 0 days.

(21) Appl. No.: 16/985,781

(22) Filed: Aug. 5, 2020

(51) Int. Cl.
*H04L 29/06* (2006.01)
*H04N 7/15* (2006.01)

(52) U.S. Cl.
CPC .............. *H04L 65/605* (2013.01); *H04N 7/15* (2013.01); *H04L 65/608* (2013.01)

(58) Field of Classification Search
USPC ....................................................... 348/14.02
See application file for complete search history.

(56) References Cited

U.S. PATENT DOCUMENTS

| | | | | |
|---|---|---|---|---|
| 10,819,950 B1* | 10/2020 | Lichtenberg | .......... | G10L 19/018 |
| 2008/0298571 A1* | 12/2008 | Kurtz | ..................... | H04N 7/142 |
| | | | | 379/156 |
| 2015/0070516 A1* | 3/2015 | Shoemake | ......... | H04N 21/4755 |
| | | | | 348/207.11 |
| 2018/0176641 A1* | 6/2018 | Yun | .................. | H04N 21/44016 |
| 2020/0134298 A1* | 4/2020 | Zavesky | ................. | A63F 13/34 |

* cited by examiner

*Primary Examiner* — Maria El-Zoobi
(74) *Attorney, Agent, or Firm* — Young Basile Hanlon & MacFarlane, P.C.

(57) ABSTRACT

Content moderation in real-time communication includes receiving, by a sending device of a sending user, a first portion of a media stream from the sending user; determining, by the sending device, that the first portion of the media stream is classified as uncertain for transmission to a receiving user; transmitting, by the sending device to a centralized content moderation device, the first portion of the media stream, where the centralized content moderation device determines a centralized determination of whether the first portion is appropriate; in response to the centralized determination indicating that the first portion is appropriate, transmitting, by the sending device to the receiving user, the first portion; and, in response to the centralized determination indicating that the first portion is inappropriate, transmitting, by the sending device to the receiving user, a blurred first portion of the first portion.

20 Claims, 6 Drawing Sheets

SCALABLE MULTI-LEVEL COLLABORATIVE CONTENT MODERATION

TECHNICAL FIELD

This disclosure relates generally to content moderation and more specifically to scalable multi-level collaborative content moderation.

BACKGROUND

Many interactions occur online over different communication channels and via many media types. An example of such interactions is real-time communication using video conferencing or streaming. The video can include audio and visual content. One user (i.e., a sending user) may transmit a user-generated content (e.g., the video) to one or more receiving users. For example, a concert may be live-streamed to many viewers. For example, a teacher may live-stream a classroom session to students. For example, a few users may hold a live chat session that includes live video.

However, live-streamed media can present concerns. The media can include harmful material that can cause damage to recipients, particularly children and/or vulnerable people. For example, the media can include child-abuse, violence, hate speech, prohibited political topics, graphic, sexual, cruel and insensitive, or other types of harmful content.

Systems and techniques for identifying and mitigating harmful content in real-time media (e.g., video) communication are desirable for limiting (e.g., reducing or eliminating) harmful content from reaching recipients.

SUMMARY

Disclosed herein are aspects, features, elements, and implementations for scalable multi-level collaborative content moderation.

A first aspect is an apparatus for content moderation in real-time communication. The apparatus includes a memory and a processor. The processor is configured to execute instructions stored in the memory to receive a first portion of a media stream from a sending user; and determine a classification of the first portion of the media stream, where the classification is indicative of an appropriateness of transmission of the first portion to a receiving user, where the classification is one of appropriate, inappropriate, or uncertain, and where the classification of uncertain indicates that the first portion cannot be determined with sufficient certainty whether the first portion is appropriate or inappropriate. The instructions also include, in response to determining that the first portion is uncertain for transmission to the receiving user, perform instructions to: transmit, to a centralized content moderation device, the first portion of the media stream, where the centralized content moderation device determines a centralized determination of whether the first portion is appropriate; and in response to the centralized determination indicating that the first portion of the media stream is inappropriate: blur the first portion to obtain a blurred first portion; and transmit, to the receiving user, the blurred first portion. The instructions also include, in response to determining that the first portion is appropriate, transmit the first portion to the receiving user.

A second aspect is a system for content moderation in real-time communication. The system includes a centralized content moderation device and a user-side content moderation device. The user-side content moderation device configured to receive a first portion of a media stream from a sending user; determine whether the first portion of the media stream is appropriate for sending to a receiving user; on a first condition that the first portion of the media stream is not determined to be appropriate and the media stream is not determined to be inappropriate for sending to the receiving user: scale the first portion of the media stream to obtain a scaled first portion of the media stream; forward the scaled first portion of the media stream to the centralized content moderation device; receive, from the centralized content moderation device, a centralized determination as to whether the first portion of the media stream is inappropriate; and use the centralized determination to determine whether to transmit the first portion or a blurred first portion of the first portion to the receiving user; and on a second condition that the first portion of the media stream is determined to be appropriate for sending to the receiving user: transmit the first portion of the media stream to the receiving user.

A third aspect is a method for content moderation in real-time communication. The method includes receiving, by a sending device of a sending user, a first portion of a media stream from the sending user; determining, by the sending device, that the first portion of the media stream is classified as uncertain for transmission to a receiving user, wherein a classification of uncertain indicates that the first portion cannot be determined with certainty whether the first portion is appropriate or inappropriate for transmission to the receiving user; transmitting, by the sending device to a centralized content moderation device, the first portion of the media stream, wherein the centralized content moderation device determines a centralized determination of whether the first portion is appropriate; in response to the centralized determination indicating that the first portion is appropriate, transmitting, by the sending device to the receiving user, the first portion; and, in response to the centralized determination indicating that the first portion is inappropriate, transmitting, by the sending device to the receiving user, a blurred first portion of the first portion.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

BRIEF DESCRIPTION OF THE DRAWINGS

The description herein makes reference to the accompanying drawings wherein like reference numerals refer to like parts throughout the several views.

DETAILED DESCRIPTION

As mentioned above media content may be transmitted from a sender (i.e., a sending user) to a recipient (i.e., receiver, receiving user). The recipient can be multiple simultaneous receiving users. As mentioned above, the media content may include harmful content. Examples of harmful content include child-abuse, violence, hate speech, prohibited political topics, graphic, sexual, cruel and insensitive, or other types of harmful content.

Content moderation is the practice of injecting a content moderation (CM) system (e.g., module, algorithm, etc.) between the sender and the recipient whereby the CM system determines whether the transmitted media content is appropriate for the receiving user to receive. The media content is appropriate if the media content does not include harmful content. The media content is inappropriate if the media content includes harmful content. In an example, if the media content is appropriate, then the media content can be forwarded to the receiving user. Different content moderation systems may implement different workflows for the handling of appropriate and inappropriate content. In an example, if the media content is inappropriate, then the media content may be blocked and not forwarded to the receiving user.

For brevity of explanation, media content that is video content is mostly used herein. However, the disclosure is not so limited and techniques and systems described herein can be used with any media content types.

Figure 1:
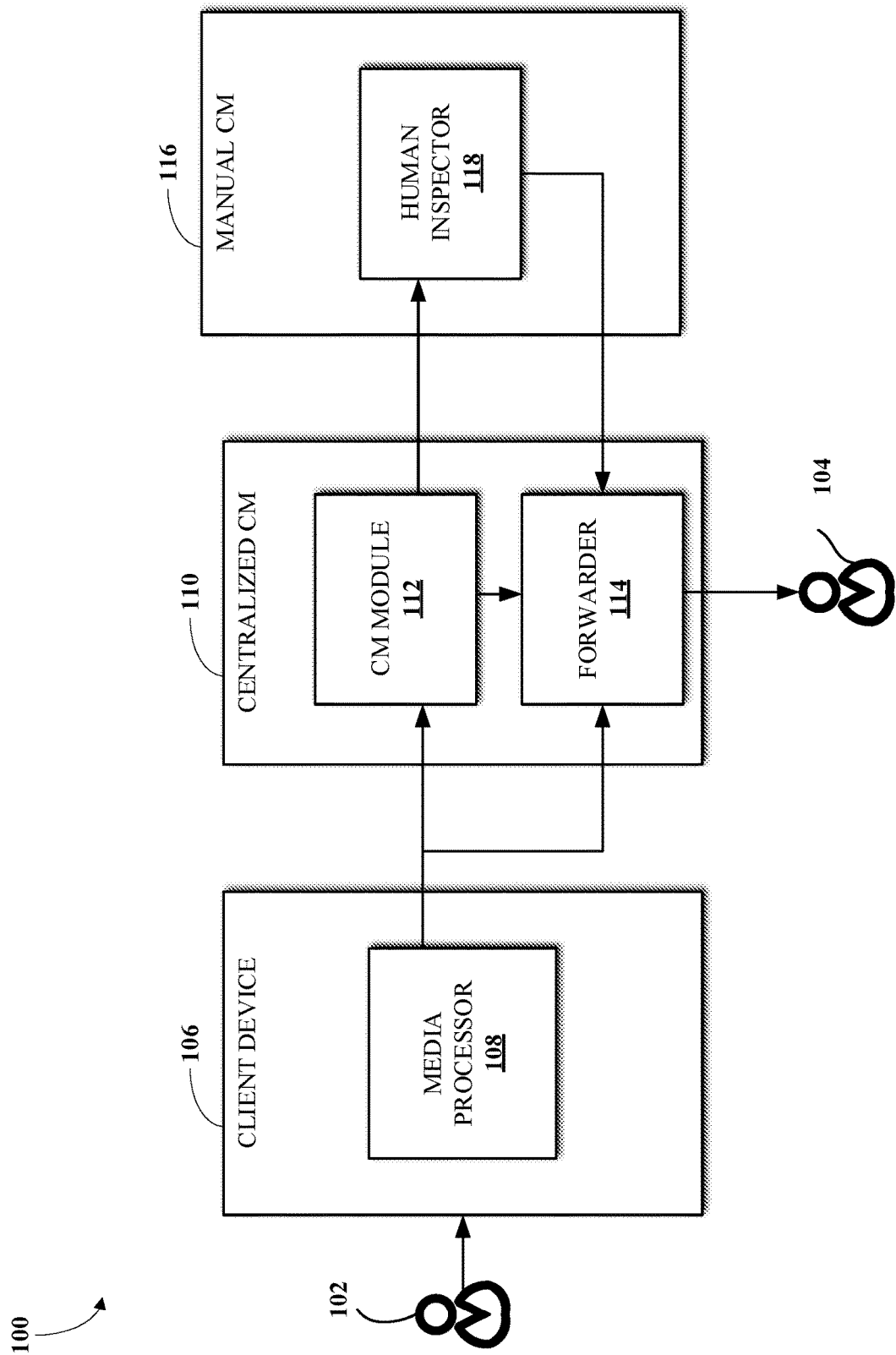
FIG. 1 is a schematic of an example of a content moderation (CM) system.

FIG. 1 is a schematic of an example of a content moderation (CM) system (i.e., a CM system 100). The CM system 100 includes a sending user 102 and a receiving user 104. As mentioned above, the receiving user 104 can be one or more receiving users. The sending user may want to transmit a media content (e.g., a video, an image, a textual message, an audio message, etc.) to the receiving user 104.

In an example, the sending user 102 may create a user-generated content (UGC) that is a video, which the sending user 102 uploads to a video sharing service from which the receiving user can view the media content. The sharing service can include, or can be in communication with, a centralized content moderation system (i.e., a centralized CM 110). In another example, the sending user 102 may wish to post a posting, which can be a video, audio, textual, or the like posting, to a social network site, which can be or can include the centralized CM 110. The centralized CM 110 is typically an internet-based system (such as a cloud-based system).

The content moderation system can be, or can include, an automated system. In an example, the automated system can be, or can include, a machine-learning (ML) model that is trained to classify content as either appropriate or inappropriate. In some examples, the ML model may not be able to determine with sufficient certainty whether the media content is appropriate or inappropriate, such as due to insufficient training, bad content media quality, or some other reason. In such cases, the ML model may classify the media content as uncertain. That is, the ML model can output the label "uncertain" or any other such output that indicates that the ML model could not determine (e.g., infer, etc.) with sufficient certainty whether the media content is appropriate or inappropriate.

The content moderation system can be or can include human moderators who review the media content to determine whether the media content is appropriate or inappropriate. In some examples, the content moderation system can include both an automated system and human moderators. For example, if the automated system is uncertain as to the appropriateness of a media content, the media content can be forwarded to a human moderator who can make the determination.

The CM system 100 includes a client device 106, which the user can use to create (e.g., record, write, generate, etc.) the media content. In an example, the client device 106 can be a device of the user, such as a mobile device, a desktop device, or the like. In an example, the client device 106 can be a computer having an internal configuration of hardware such as that described in FIG. 2. However, other implementations of the client device 106 are possible. For example, the processing of the client device 106 can be distributed among multiple devices. The client device 106 can include a media processing module 108. In the case that the media content is a video, the media processing module 108 can be a video encoder, which can be used to encode (e.g., compress) the video prior to upload (e.g., transmission over a network) to the centralized CM 110. Encoding the media content prior to transmission to the centralized CM 110 can save network bandwidth. The centralized CM 110, or a component or module therein, can decode the video prior to further processing, as described below.

A network (not shown) can connect the client device 106 and the centralized CM 110. The network can be, for example, an IP network, such as the Internet. The network can be a wide area network (WAN), virtual private network (VPN), cellular telephone network, or any other means of transferring information (e.g., a media content) from the client device 106 to the centralized CM 110.

At the centralized CM 110, a CM module 112 and a forwarding module 114 can receive the media content. Each of CM module 112 and the forwarding module 114 can be, or can be included in, one or more computers having internal configurations of hardware such as that described in FIG. 2. As mentioned above, the media content can be video content. The video content can include visual content, audio content, or both. In an example, the visual content may be moving visual content. In another example, the visual content may be static or rarely changing visual content.

At least some pictures (e.g., frames) of the visual content and/or some frames of the audio content can be extracted/decoded and input to the CM module 112. For example, one frame in every second (or some other frequency) of the video content can be extracted. In another example, every frame of the media content can be extracted and input to the CM module 112.

The CM module 112 can be or can include an ML model, as mentioned above. In the case of visual data, the ML model can be, or can include, a computer vision engine that can output a classification decision as to the appropriateness of the visual content. For example, the CM module 112 can output a classification indicating whether the visual content is appropriate, inappropriate, or uncertain. The uncertain classification indicates that the CM module 112 could not determine, with sufficient certainty, whether the content is appropriate or is inappropriate.

The CM module 112 can include additional ML models that are each trained to classify certain media types or certain semantics. For example, one of the ML models can be trained to identify offensive language and/or words in audio media. In an example, the CM module 112 can include more than one ML model, each trained to classify different types of information. For example, one ML model may be trained to identify visual content that depicts violent acts while another may be trained to identify visual content that includes sexual acts.

The classification output from the CM module 112 can be input to the forwarding module 114. If the classification indicates that the media content is appropriate, then the forwarding module 114 can forward the media content to the receiving user 104. If the classification indicates that the media content is inappropriate, then the classification can be used to determine a next action.

In an example, the forwarding module 114 blocks the media content. That is, the forwarding module 114 does not forward the media content to the receiving user 104. In an example, the forwarding module 114 can send, or can cause to be sent, a warning to the sending user 102 regarding the inappropriateness of the media content. In an example, the forwarding module 114 can send, or can cause to be sent, a notice to the receiving user 104. In an example, the forwarding module 114 can blur the media content before forwarding the media content to the receiving user 104. As such, the receiving user cannot perceive or listen to the inappropriate blurred content. Other actions are possible including combinations of actions.

In the case that the classification indicates uncertainty, the media content (or the extracted frames therefrom) can be forwarded to a human inspector 118 at a manual CM center 116. After reviewing the received content, the human inspector 118 can return a classification indicating whether the media content is appropriate or inappropriate to the forwarding module 114, which uses the classification as described above.

FIG. 1 describes a typical content moderation system. However, content moderation according to the CM system 100 can result in degraded performance and latencies in real-time communications, such as in video conferencing applications or other live-streaming applications. This is so because it can take a few seconds (e.g., up to 5 to 7 seconds) to encode the media content at the client device 106, transmit the encoded media content over the network, decode the media content at the centralized CM 110, classify the media content by the CM module 112, and take actions according to the classification result. Such delays are unacceptable and degrade the user experience if appropriate content is held or blurred until the actions are taken. On the other hand, if inappropriate content is neither held nor blurred when it is inappropriate, content moderation according to the CM system 100 can result in leaked inappropriate content. That is, a receiving user may receive inappropriate content. This can happen, depending on the policies of the centralized CM system 316.

Figure 3:
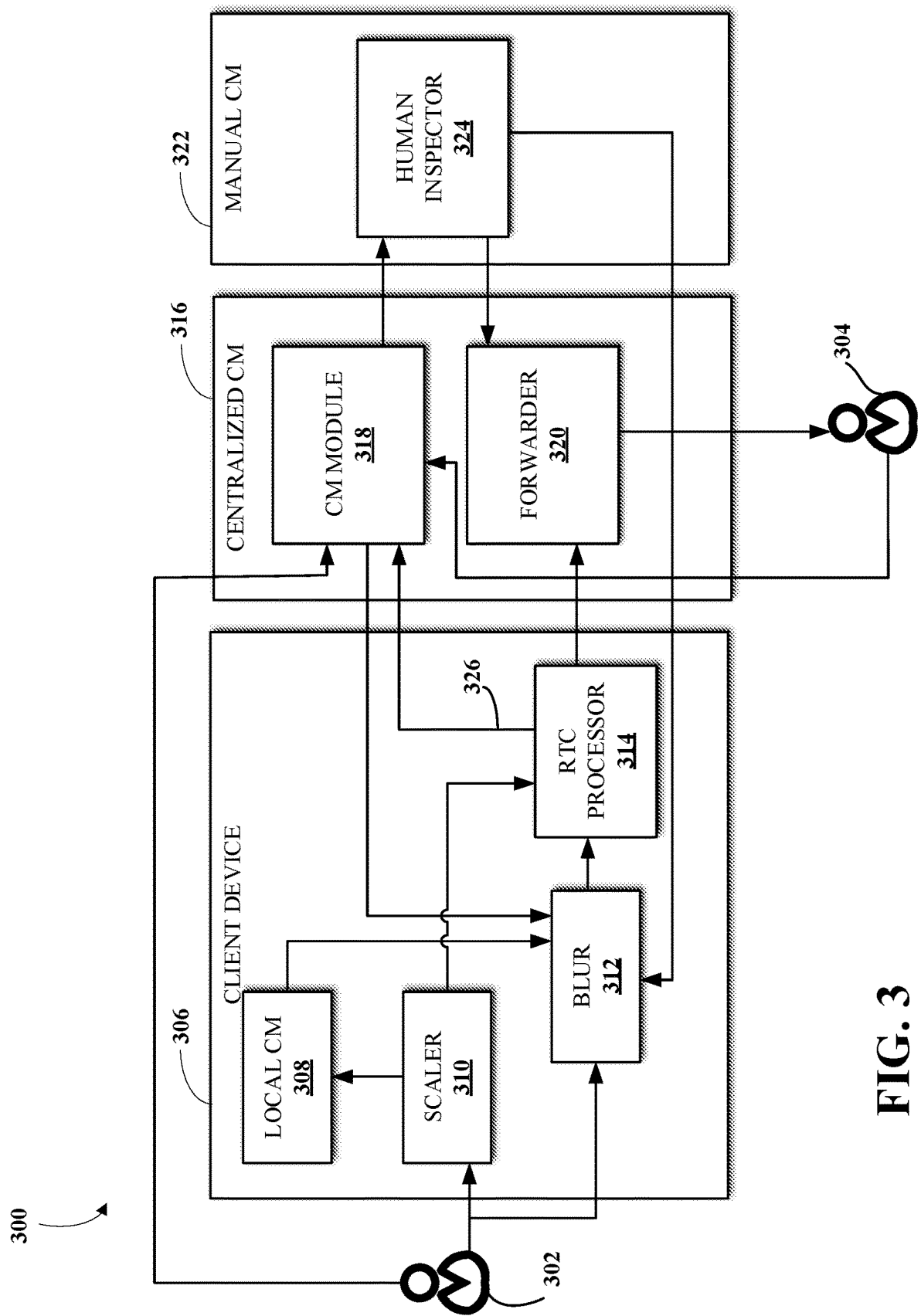
FIG. 3 is a schematic of an example of a content moderation (CM) system for real-time communications in accordance with implementations of this disclosure.

It is noted that while media content is described above with respect to FIG. 1 as a monolithic piece of content, in real-time applications, portions of a media stream need to be continuously evaluated as they are streamed. Thus, while, for example, one five-second delay may be tolerated by the sending and the receiving users, the stacking of five-second delays can become intolerable. Thus, the content moderation system described with respect to FIG. 1 is not acceptable for real-time applications. FIG. 3 describes an improved content moderation system that can be used for real-time applications.

Figure 2:
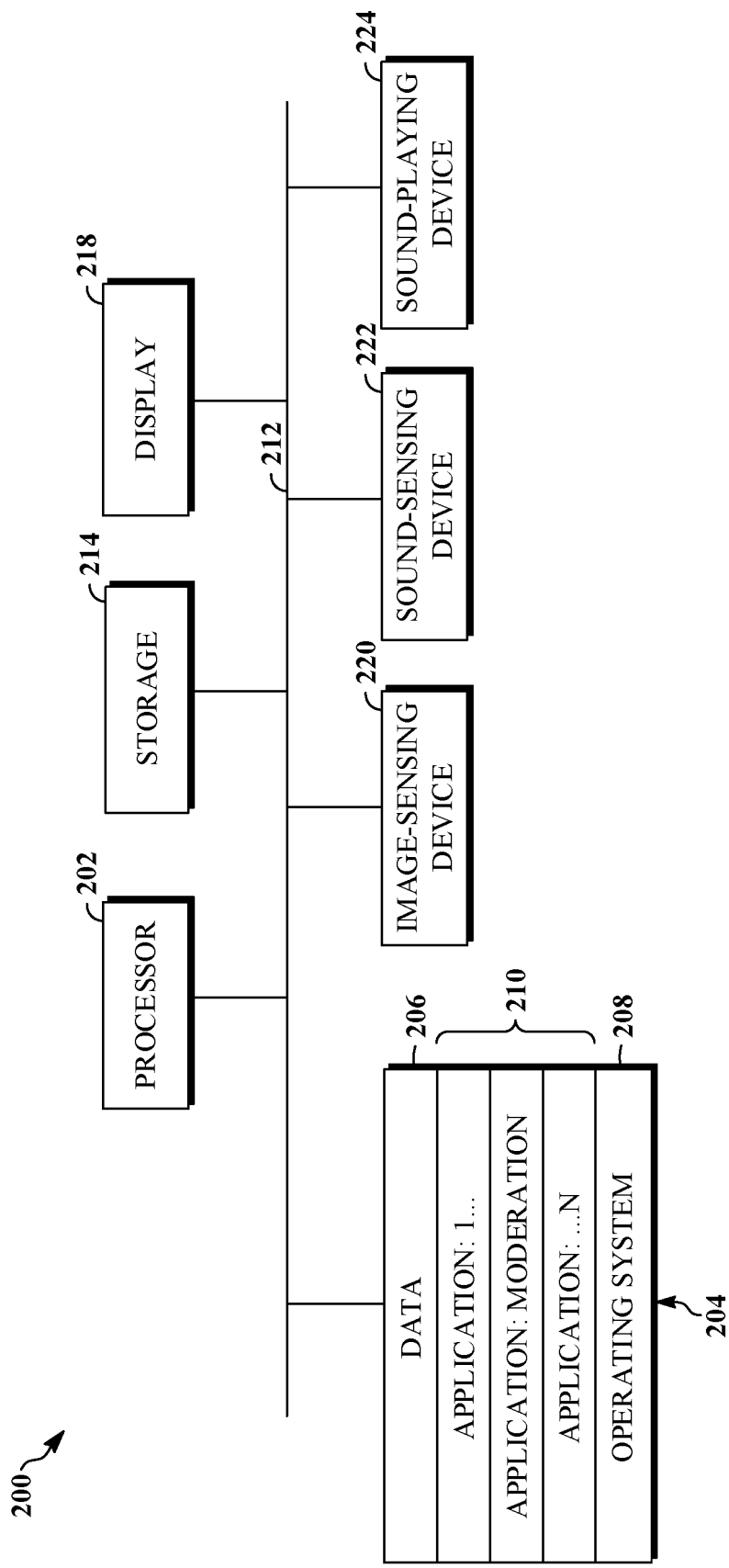
FIG. 2 is a block diagram of an example of a computing device in accordance with implementations of this disclosure.

FIG. 2 is a block diagram of an example of a computing device 200 in accordance with implementations of this disclosure. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage devices can be used as the memory 204. The memory 204 can include code and data 206 that are accessed by the processor 202 using a bus 212. The memory 204 can further include an operating system 208 and application programs 210, the application programs 210 including at least one program that permits the processor 202 to perform at least some of the techniques described herein. For example, the application programs 210 can include applications 1 through N, which further include applications and techniques useful in content moderation in real-time communications. The computing device 200 can also include a secondary storage 214, which can, for example, be a memory card used with a mobile computing device.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200. The computing device 200 can also include or be in communication with a sound-playing device 224, for example, a speaker, a headset, or any other sound-playing device now existing or hereafter developed that can play sounds as directed by the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

As mentioned above, a configuration of a content management system according to FIG. 1 can result in unacceptable latencies and delays in real-time communications. In non-real-time content delivery systems, there can be a time buffer between the time that a sending user uploads a UGC to a content sharing system and a later time that a receiving user views the UGC. During that time buffer, the UGC can be scrutinized (e.g., evaluated, inspected, etc.), whether automatically, manually, or both, to determine whether the media content, or portions therein, are inappropriate. In non-real-time communications, the time buffer can be many minutes, hours, days, or longer. No such time buffer exists in real-time communications. In real-time communications, where participants expect face-to-face like communications, low latency is critical.

In some configurations, a first portion of the media stream may be blurred at the client device until a determination can be obtained by the client device, from a centralized CM system, as to whether the first portion of the media stream was appropriate or inappropriate. If the first portion is appropriate, then the client device can unblur a second portion before transmitting the second portion to a receiving user. Thus, the receiving user needlessly received the blurred first portion where blurring was not necessary. If the first portion is determined to be inappropriate by the centralized CM system, then the client device can continue to blur the second portion.

Additionally, in such a configuration, inappropriate content may leak to the receiving user. For example, a malicious sending user can transmit a first portion of the media stream that is deemed by the centralized CM system as being appropriate. Thus, the client device will transmit the second portion as unblurred. However, the malicious sending user may intentionally include inappropriate content in the second portion of the media stream. Thus, the receiving user receives an unblurred inappropriate second portion of the media stream.

FIG. 3 is a schematic of an example of a content moderation (CM) system (i.e., a CM system 300) for real-time communications in accordance with implementations of this disclosure. The CM system 300 overcomes the above-described limitations in content moderation.

The CM system 300 shows a sending user 302 and a receiving user 304 who are engaged in real time communications. The receiving user can be multiple receiving users. For example the sending user 302 and the receiving user 304 can be participants in a video conferencing session. Thus, both users can be sending and receiving users. For example, the sending user 302 may be live-streaming media content to the receiving user 304. To be more specific, while not specifically shown in FIG. 3, the receiving user 304 receives the media content on a device (e.g., a mobile device, a desktop device, a TV, etc.) via which the receiving user 304 can consume (e.g., view, read, listen to, etc.) the media content in real time.

The CM system 300 includes a client device 306 and a centralized content moderation (CM) system (i.e., centralized CM system 316). In some configurations, the CM system 300 can also include manual inspection 322. The client device 306 can be one or more computing devices, such as the computing device 200 of FIG. 2. The client device 306 can be a mobile device, a desktop device, or any such device. The client device 306 can include a local CM module 308, a scaling module 310, a blurring module 312, and a real-time communications (RTC) module (i.e., an RTC module 314). In some configurations, one or more of the local CM module 308, the scaling module 310, the blurring module 312, or the RTC module 314 may be on one or more other on-premise devices other than client device 306. An on-premise device is a device that is on the same local area network (LAN) as the client device 306. Thus, the access latency between the client device 306 and such other on-premise device is negligible.

By way of illustration only, and without loss of generality, the sending user 302 can use a camera, a microphone, or both of the client device 306 to capture and stream video and/or audio content to the receiving user 304.

The media content (e.g., a media stream) can be simultaneously received by the scaling module 310 and the blurring module 312. To be more specific, the media content is received in portions as the portions are captured and are to be streamed. Thus, the media content is composed of multiple portions that are received and processed over time as the stream progresses. Thus, the media content can include a first portion and a second portion, which follows the first portion.

The scaling module 310 can create a scaled down version of the first portion (i.e., a scaled first portion). The scaled first portion is a lower resolution version of the first portion. To illustrate, the first portion may be captured in 1080 pixels high definition and the scaled first portion can be a 480p standard definition resolution. The first portion can be scaled down to any size that would require less bandwidth to transmit to the centralized CM system 316 than the unscaled first portion. In an example, the scaler may not scale the first portion down if the first portion does not exceed a threshold resolution. In an example, the scaling module 310 can scale the first portion to a resolution of images that the local CM module 308 and/or the centralized CM module 318 were trained using. The scaling module 310 forwards the scaled first portion to the local CM module 308 and to the RTC module 314. In an example, the local CM module 308 receives an unscaled version of the media portion.

The local CM module 308 can be an ML model that can determine whether the first portion includes harmful content. A configuration of the ML model is further described below. The local CM module 308 can be functionally similar to the CM module 112 of FIG. 1 and a centralized CM module 318, which is described below. However, as the local CM module 308 may be executed on a user device (i.e., the client device 306), which is not as capable as a centralized (e.g., cloud-based) server, where the centralized CM module 318 would execute, the ML model of the local CM module 308 is smaller than that of the centralized CM module 318. The client device 306 is limited in compute capacity, power consumption capacity, memory capacity, and storage capacity as compared to a centralized server.

For example, whereas the ML model of the centralized CM module 318 can be 99% accurate in recognizing whether a portion of media content is appropriate or not, the ML model of the local CM module 308 may provide only 95% accuracy, which is still fairly significant thereby enabling a high percentage of the content can be correctly recognized (e.g., categorized, classified, identified, etc.) at the client device 306. Typically, the ML model of the local CM module 308 may be two orders of magnitude (e.g., more than a hundred time) smaller than that of the centralized CM module 318. To illustrate, and without loss of generality, whereas the ML model of the centralized CM module 318 may include 30 million parameters, the ML model of the local CM module 308 may include 500,000 parameters or less.

The local CM module 308 can output a classification of the media portion received by the local CM module 308. The classification indicates whether the media portion is appropriate, inappropriate, or uncertain. As used herein, the term "not appropriate" indicates one of the classifications "inappropriate" or "uncertain." To output a classification of the media portion, the local CM module may examine every frame of the media portion or a subset of the frames. For example, the local CM module 308 may examine one frame, two frames, or some other number of frames for every one second of the media portion.

The RTC module 314 can be or can include an encoder for encoding the media stream that is to be transmitted from the sending user 302 to the receiving user 304. In an example, the RTC module 314 can include one or more other modules. For example, the RTC module 314 can include one or more pre-processing modules for reducing noise, adding a virtual background, adding filters to or beautifying the face of the sending user 302, and so on.

A real-time transport protocol (RTP) can be used for transmission of the encoded media content over the network. In another implementation, a transport protocol other than RTP may be used (e.g., a Hypertext Transfer Protocol-based (HTTP-based) streaming protocol). For example, the client device 306 can transmit the media content to the receiving user 304 via WebRTC, which provides web browsers and mobile applications with real-time communication. However, the disclosure herein is not so limited and any other real-time transmission protocol can be used.

The blurring module 312 determines whether to blur the portions of the media based on the input received from the local CM module 308. If the local CM module 308 determines that the portion of the media content is appropriate, then the blurring module 312 does not blur the portion before handing the portion of the media on to the RTC module 314 for transmission. On the other hand, if the local CM module 308 determines that the portion of the media is inappropriate, then the blurring module 312 blurs the portion of the media to generate a blurred portion. The blurred portion is then passed to the RTC module 314 for transmission to the receiving user 304. If the local CM module 308 cannot determine with sufficient certainty whether the portion of media is appropriate or inappropriate, then the blurring module 312 determines whether to blur the portion of the media based on a pre-configured policy. If the policy is configured to a first policy (e.g., "permissive" or an equivalent), then the blurring module 312 does not blur the media portion that is classified as uncertain by the local CM module 308. If the policy is configured to a second policy (e.g., "restrictive" or an equivalent), then the blurring module 312 blurs the media portion that is classified as uncertain by the local CM module 308. If the policy is configured to a third policy (e.g., "double check" or an equivalent), the scaled portion of the media can be forwarded to the centralized CM module 318 for classification. In an example, the policy can be configured to be the "restrictive" policy so that the blurring module 312 continues to blur subsequent portions of the media while awaiting the result of the classification from the centralized CM module 318.

In an example, if the media portion is classified as uncertain by the local CM module 308, then the corresponding scaled portion can be forwarded to the centralized CM module 318 for classification. The centralized CM module 318 can return a classification of appropriate or inappropriate to the blurring module 312, which then determines whether to continue to blur or not blur the media portion, as described above. Thus, whenever the local CM module 308 classifies a media portion as uncertain, then the blurring module 312 can rely on the classification of the centralized CM module 318.

If the centralized CM module 318 also classifies the media portion as uncertain, then the centralized CM module 318 can forward the media portion to a human inspector 324 at a manual inspection 322. The human inspector 324 returns a classification of appropriate or inappropriate to the blurring module 312. In an example, the blurring module 312 blocks until an appropriate or an inappropriate classification is received (whether from the local CM module 308, the centralized CM module 318, or the human inspector 324). In another example, the blurring module 312 blocks only for a predetermined period of time. The predetermined period of time can be 1 second, 2 seconds, 3 seconds, or some other number of seconds. If a classification of the portion of the media is not received by the blurring module 312 within the predetermined period of time after the portion of the media is received at the blurring module 312, then the blurring module can blur the portion of the media according to one of the preconfigured restrictive or permissive policies.

If the first portion of the media is classified as uncertain by the local CM module 308, the first portion can be blurred before a classification is received from either the centralized CM module 318 or the human inspector 324 so that the client device 306 is pre-prepared for a worst case scenario (i.e., an inappropriate classification). Thus, the "restrictive" policy can be implemented. As such, when the blurring module 312 receives a classification of inappropriate, the blurring module 312 need not incur further processing delays to blur the first portion. However, in some implementations, the first portion can be blurred by the blurring module 312 only after a classification of inappropriate is received.

An ML model based on computer vision recognition algorithms for content moderation may not be 100% accurate. That is, there may be false positives and/or false negatives. As such, the sending user can appeal (i.e., send a report) to the centralized CM module 318 if the user believes that the portion of the media content is erroneously blocked or blurred. Similarly, the receiving user can report, to the centralized CM module 318, a received portion of the media content that the receiving user believes is inappropriate but was not blocked or blurred. In such cases, the potentially erroneously classified portion of the media content can be forwarded by the centralized CM module 318 to the human inspector 324 for further determination. More specifically, the down-scaled portion of the media stream can be forwarded to the human inspector 324.

In an example, and as illustrated in FIG. 3, the client device 306 transmits the media stream (i.e., blurred or unblurred portions of the media stream) to the receiving user via a forwarding module 320 of the centralized CM system 316. That is, the media portions are received from the client device at the forwarding module 320, which in turns transmits the media portions to the receiving user 304. In another example, the communication from the sending user to the receiving user may be a direct peer-to-peer communication. Thus, the media portions can be directly received at a device of the receiving user 304 from the client device 306 of the sending user.

The centralized CM system 316 may be a hosting service that can receive streamed content from one user for delivery to other users. For example, the hosting service may be a video conferencing service that receives streamed content from multiple sending users, creates a single stream out of the multiple streams, and transmits the single stream to multiple receiving users. Each of the receiving and sending users can simultaneously be a sending and a receiving user. However, the hosting services in this disclosure are not so limited.

To reiterate, a solution for content moderation in real-time communication, as described with respect to FIG. 3, is to perform content moderation at a sender device side by a local CM module, such as the local CM module 308 of FIG. 3. For example, the local CM module can take video frames and/or audio frames from an input video stream (e.g., from a portion of the video stream) and can detect accordingly whether the content of the portion of the video stream is appropriate or inappropriate. If the content is appropriate, the portion of the video stream is not blurred or blocked. The portion of the video stream is then processed (e.g., preprocessed, encoded, etc.) and transmitted normally. If the portion of the video stream is inappropriate, the portion of the video stream is blurred or blocked immediately so that a receiver will only be able to see a blurred or blank version of the portion of the video stream.

When the local CM module classifies the portion as uncertain, the portion can be temporarily blurred or blocked. The portion of the media is then scaled down, such as by the scaling module 310 of FIG. 3. The down-scaled portion of the media can then be processed and transmitted to a centralized CM module, such as the centralized CM module 318 of FIG. 3, for a second level detection (e.g., classification, evaluation, inspection, etc.). As mentioned above, the centralized CM module 318 can be a cloud-based content moderation system.

As mentioned above, the centralized CM module algorithm can be more accurate than the local CM algorithm because the centralized CM module can be a more complex algorithm. If the centralized CM module finds the portion of the media is appropriate, the centralized CM module signals to the sending device (e.g., to a blurring module of the client device) and blurring can be turned off for the portion of the video so that the portion of the media stream can be transmitted to the receiving user. If the centralized CM module determines that the portion of the media is inappropriate, the centralized CM module 318 signals the sending device accordingly and the client device (e.g., the blurring module of the client device) can continue to blur the video.

If the centralized CM module cannot determine whether the portion of the media is appropriate or inappropriate, the down-scaled portion of the video can be sent to a human inspector, whose decision will be sent back to the sending device (e.g., to the blurring module of the client device) and proper actions can be taken similarly.

The local CM module can correctly classify a portion of a media stream (as appropriate or inappropriate) in the majority of the times. For example, and as described above, a properly designed modern deep-learning based CM algorithm can achieve more than 95% of classification accuracy. As such, most inappropriate or appropriate content can be immediately recognized and processed at, or proximal to, the sending client device (i.e., the device of the sending user) without delay. This prevents the detected inappropriate content from being leaked at all. Additionally, content moderation at the client device allows for appropriate and inappropriate content, as determined by the local CM module, to go through (i.e., transmitted to the receiving user) without delay thereby significantly improving the user experience of real time communications.

In the rare cases when the local CM module is not certain about the portion of the media content (i.e., classifies the portion as uncertain), the portion of the media can be scaled down and the scaled-down portion can be processed and transmitted to the centralized CM module for further detection while the normal video can be blurred or blocked temporarily. The down-scaling of the portion of the media can result in savings in network bandwidth and in server computing power (where the centralized CM module executes) because both the down-scaled video and blurred video take significantly smaller amount of bitrate to encode and transmit. The down-scaled portion of the media does not affect the centralized CM module effectiveness as modern deep-learning based computer vision recognition algorithms can operate on small picture sizes such as 224×224 pixels or 240×240 pixels. It is noted that the size of the video in real-time video communications can usually be larger, such as 640×360 pixels or 1280×720 pixels. The down-scaled video can be scaled to the exact size that is desired by the centralized CM module.

As mentioned above, if the media portion is classified as uncertain by the local CM module 308, then the corresponding scaled portion can be forwarded to the centralized CM module 318 for classification. In an example, if the media portion is classified as uncertain by the local CM module 308, the corresponding scaled portion can be forwarded by the RTC module 314 to the centralized CM module 318 for classification, as indicated by an arrow 326 of FIG. 3. In another example, if the media portion is classified as uncertain by the local CM module 308, the corresponding scaled portion can be forwarded by the RTC module 314 to the forwarding module 320, which in turn forwards the corresponding scaled portion to the centralized CM module 318 for classification, as illustrated by an arrow 602 of FIG. 6.

Figure 6:
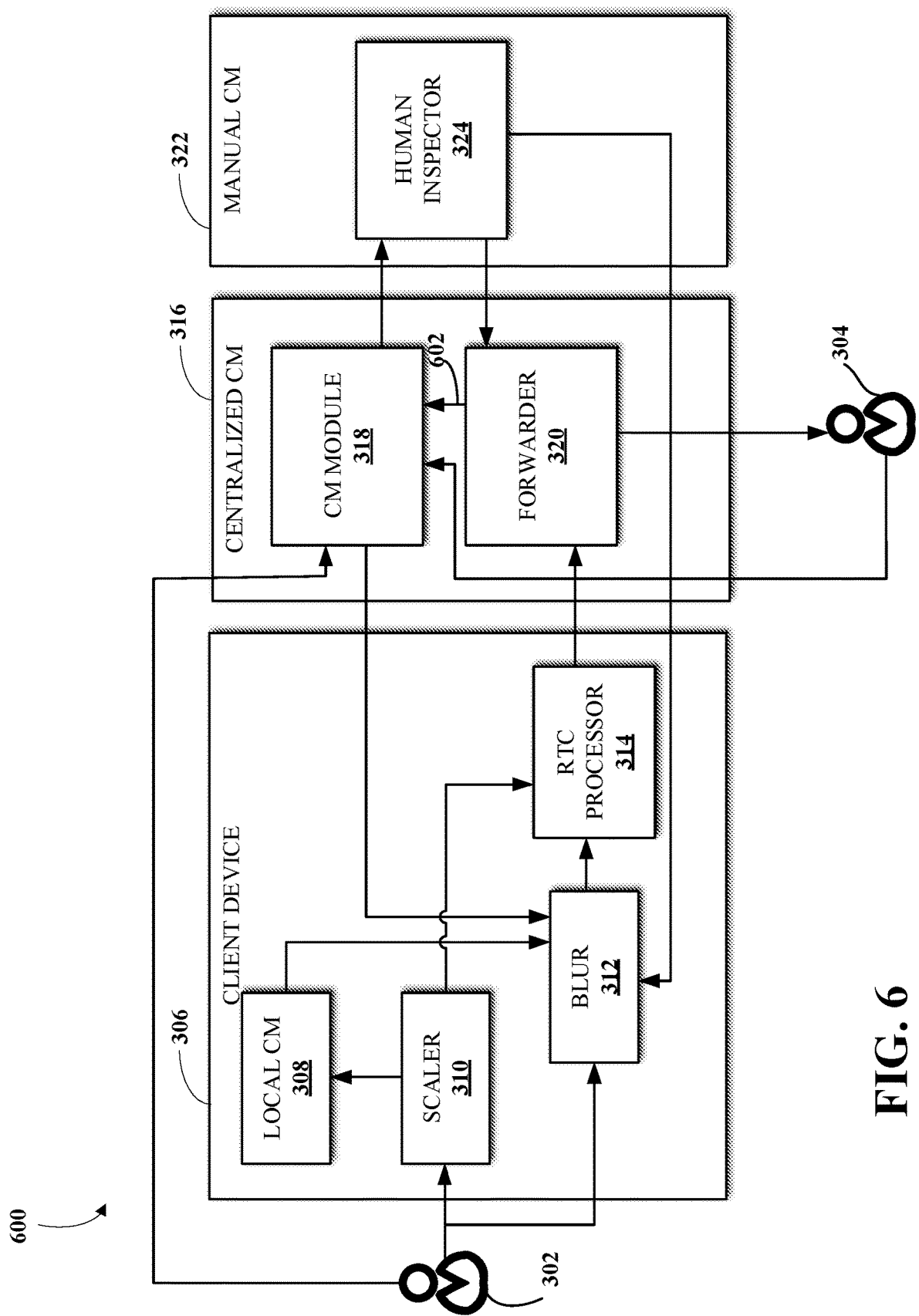
FIG. 6 is a schematic of an example of a content moderation (CM) system for real-time communications in accordance with implementations of this disclosure.

FIG. 6 is a schematic of an example of a content moderation (CM) system (i.e., a CM system 600) for real-time communications in accordance with implementations of this disclosure. Like reference numerals of FIG. 6 refer to like parts in FIG. 3 and their descriptions are omitted for brevity. In FIG. 3, the corresponding scaled portion is shown as being forwarded by the RTC module 314 to the centralized CM module 318 for classification, as indicated by an arrow 326 of FIG. 3. In FIG. 6, the corresponding scaled portion is shown as being forwarded by the RTC module 314 to the forwarding module 320, which in turn forwards the corresponding scaled portion to the centralized CM module 318 for classification, as illustrated by the arrow 602.

Figure 4:
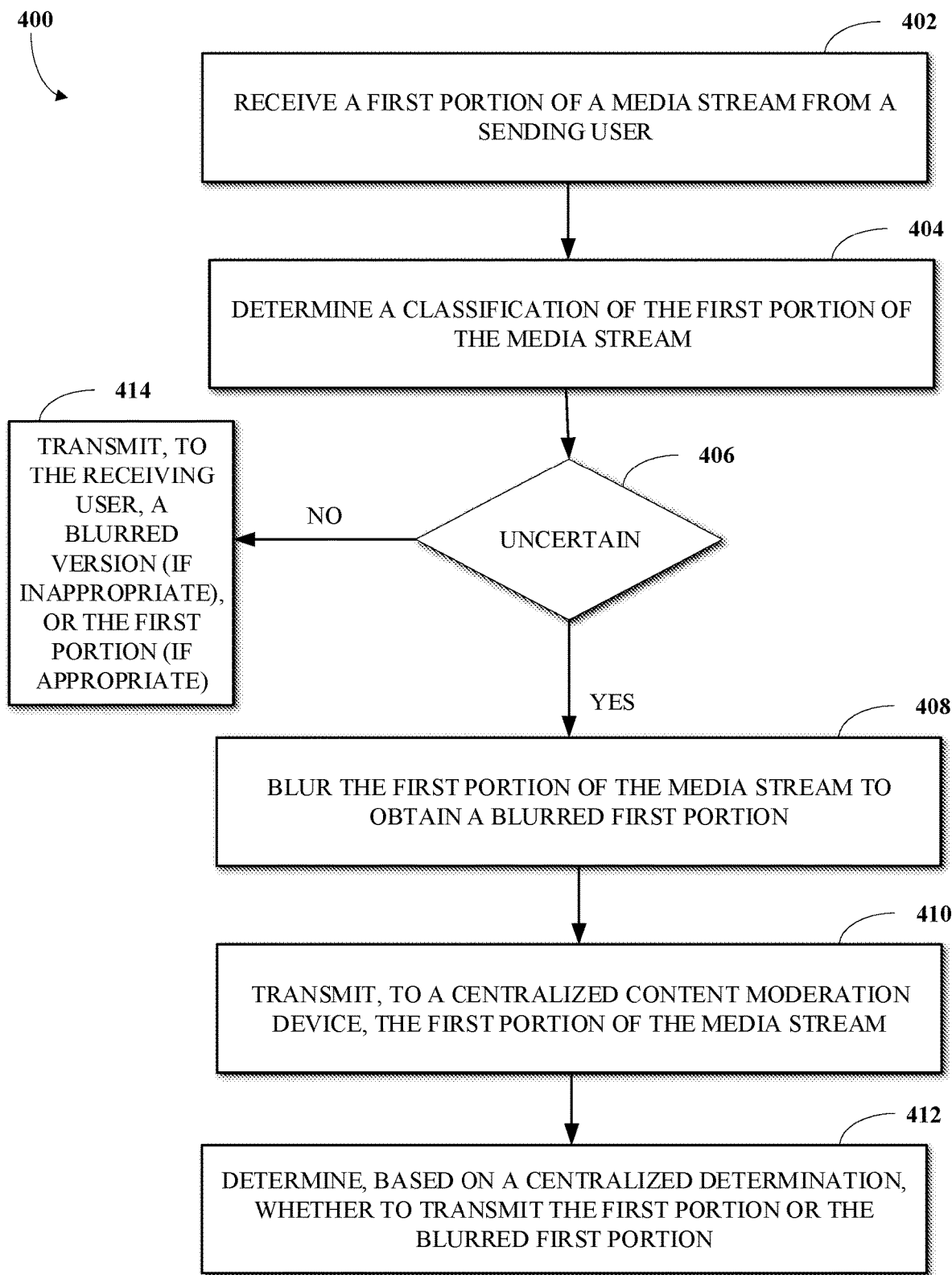
FIG. 4 is an example of a technique for content moderation at a user device in accordance with implementations of this disclosure.

FIG. 4 is an example of a technique 400 for content moderation at a user device in accordance with implementations of this disclosure. The technique 400 can be implemented by the user device, which can be the client device 306 of FIG. 3. The technique 400 can be partially or fully implemented by one or more of the local CM module 308, the scaling module 310, the blurring module 312, and/or the RTC module 314 of FIG. 3. The technique 400 can be implemented by a computing device, such as the computing device 200 of FIG. 2. The technique 400 can be stored as executable instructions in a memory, such as the memory 204 of FIG. 2. The executable instructions can be executed by a processor, such as the processor 202 of FIG. 2, to implement (e.g., perform) the steps of the technique 400. The technique 400 can be implemented as one or more hardware modules that can be configured to execute one or more of the steps of the technique 400.

The technique 400 can be used to provide content moderation in real-time applications. As mentioned above, delay in real-time communications is undesirable. Furthermore, any leaks of inappropriate video, audio, or other media type, to receivers of the media are also undesirable.

At 402, the technique 400 receives a first portion of a media stream from a sending user. The sending user can be the sending user 302 of FIG. 3. At 404, the technique 400 determines (e.g., obtains, calculates, infers, etc.) a classification indicating an appropriateness of sending the first portion to the receiving user. In an example, the classification can be one of appropriate, inappropriate, or uncertain. In an example, the first portion of the media stream can be classified as not appropriate for transmission to a receiving user. Determining that the first portion of the media stream is not appropriate is equivalent to not determining that the first portion is appropriate. For example, a local CM module of the device of the user (i.e., sending device) determines that the first portion is either inappropriate or uncertain, as described above. As such, determining that the first portion of the media stream is not appropriate for the transmission to the receiving user includes determining that the first portion of the media stream is inappropriate for transmitting to the receiving user or determining with uncertainty whether the first portion is appropriate or inappropriate.

A classification of uncertain indicates that the first portion cannot be determined with sufficient certainty whether the first portion is appropriate or inappropriate for transmission to the receiving user. In an example, determining the classification can include, or can mean, receiving a certainty percentage (e.g., confidence, etc.) and mapping the percentage to a class. Thus, in an example, the certainty percentage obtained can be compared to a threshold certainty (e.g., 85%, or some other threshold certainty). If the certainty is not at least equal to the threshold certainty, then the first portion is classified as not belonging to the class. The first portion can be classified as uncertain when it belongs neither to the class of appropriate nor to the class of inappropriate. A confidence threshold may not be explicitly associated the class of uncertain. A portion of the media stream can be classified as uncertain when it cannot be classified as either appropriate or inappropriate.

At 406, the technique 400 determines whether the first portion of the media stream is determined to be uncertain. If the first portion is determined to be uncertain, the technique 400 proceeds to 408; otherwise, the technique 400 proceeds to 414. At 414, the technique 400 can determine whether the first portion is classified as appropriate or inappropriate. In response to determining that the first portion of the media stream is appropriate (i.e., classified as appropriate), the technique 400 transmits the first portion to the receiving user. On the other hand, in response to determining that the first portion of the media stream is inappropriate, the technique 400 transmits, to the receiving user, a blurred first portion of the first portion.

At 408, the technique 400 blurs the first portion of the media stream to obtain a blurred first portion. For example, a blurring module of the sending device, such as the blurring module 312 of FIG. 3, can be used to blur the first portion of the media stream. In an example, the technique 400 may not blur the first portion to obtain the blurred first option. Rather, the blurred first portion is not obtained until the technique 400 determines that the first blurred is needed for transmission to the receiving user, as described below with respect to 412. As such, the technique 400 can perform on-demand blurring.

At 410, the technique 400 transmits, to a centralized content moderation device, the first portion of the media stream. The centralized content moderation device can be the centralized CM system 316 of FIG. 3. Thus, more specifically, in an example, the technique 400 transmits the first portion of the media stream to a centralized (e.g., cloud-based) content moderation module, such as the centralized CM module 318 of FIG. 3. The centralized content moderation device determines a centralized determination of whether the first portion is appropriate. In an example, and as described with respect to FIG. 3, a scaled first portion of the first portion can be transmitted at 410. As described with respect to FIG. 3, a scaling module can be used to scale the first portion to obtain a scaled first portion, which is then transmitted to the centralized content moderation device. In an example, the scaled first portion can be transmitted to the centralized content moderation device as described with respect to FIG. 3. In an example, the scaled first portion can be transmitted to the centralized content moderation device as described with respect to FIG. 6.

At 412, the technique 400 determines, based on the centralized determination, whether to transmit the first portion or the blurred first portion. As such, in response to the centralized determination indicating that the first portion of the media content is inappropriate, the technique 400 transmits, to the receiving user, the blurred first portion. Additionally, in response to the centralized determination indicating that the first portion of the media content is appropriate, the technique 400 transmits, to the receiving user, the first portion. As mentioned above, blurring the first portion to obtain the blurred first portion may not be performed until it is determined that the blurred first portion is to be transmitted to the receiving user.

As described with respect to FIG. 3, transmitting, to the receiving user, the blurred first portion (or the first portion) can include transmitting the blurred first portion (or the first portion) to a forwarding device that transmits the blurred first portion (or the first portion) to the receiving user. The forwarding device can be, can include, or can be similar to the forwarding module 320 of FIG. 3.

In an example, the technique 400 can include determining whether to blur a second portion of the media stream based on the centralized determination of the first portion when the technique 400 cannot determine that the second portion of the media stream is appropriate. That is, in response to determining that the second portion of the media stream is not appropriate, the technique 400 determines whether to blur the second portion of the media stream based on the centralized determination of the first portion. As described with respect to FIG. 3, so as to not delay transmission of the first portion, when the centralized determination is not returned within a predetermined period of time, the sending device can transmit the first portion according to a preconfigured policy. For the second portion of the media, which immediately follows the first portion, the technique 400 can use the centralized determination of the first portion to determine whether to blur or not blur the second portion. Thus, the technique 400 can include, in response to the centralized determination indicating that the first portion is appropriate, not blurring the second portion before transmitting the second portion to the receiving user. The technique 400 can also include, in response to the centralized determination indicating that the first portion is inappropriate, blurring the second portion before transmitting the second portion to the receiving user.

What blurring means depends on the type of the media content. Broadly, blurring means making the media content imperceptible or unintelligible to the receiving user. For example, the first portion of the media stream can include a visual portion and an audio portion. As such, blurring the first portion of the media stream to obtain the blurred first portion can include blurring the visual portion to obtain a blurred visual portion and distorting the audio portion to obtain a distorted audio portion.

Figure 5:
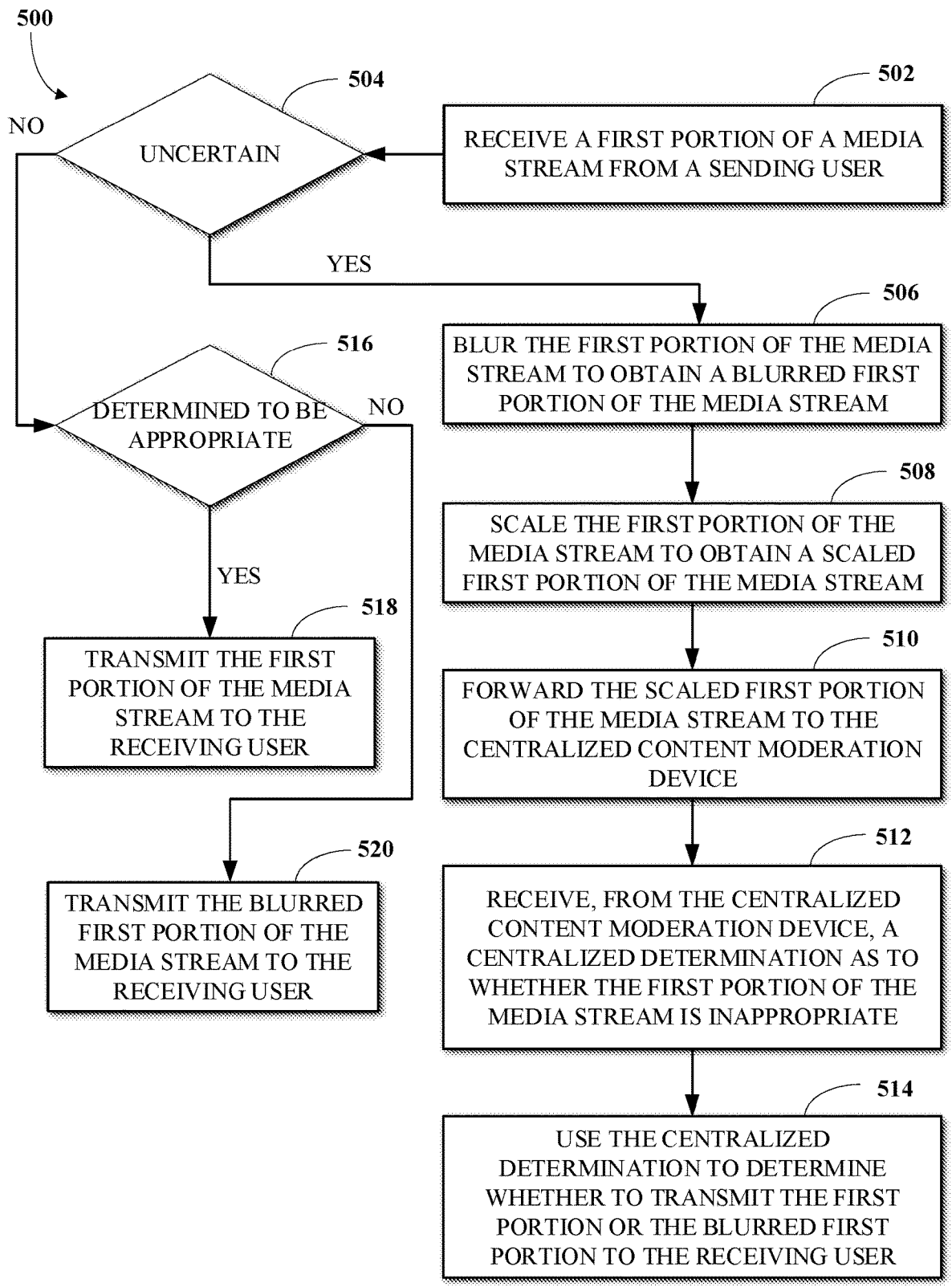
FIG. 5 is an example of a technique for content moderation by a content moderation system in accordance with implementations of this disclosure.

FIG. 5 is an example of a technique 500 for content moderation by a content moderation system in accordance with implementations of this disclosure. The content moderation system can include a centralized content moderation device and a user-side content moderation device. The centralized content moderation device can be the centralized CM system 316 of FIG. 3. The user-side content moderation device can be the client device 306 of FIG. 3.

The technique 500 can be used to provide content moderation in real-time applications. As mentioned above, delay in real-time communications is undesirable. Furthermore, any leaks of inappropriate video, audio, or other media type, to receivers of the media are also undesirable At 502, a first portion of a media stream from a sending user can be received by the user-side device. The client-side device (e.g., a local CM module of the client-side device, such as the local CM module 308 of FIG. 3) classifies the first portion into uncertain, appropriate, or inappropriate, which are as described above. At 504, on a first condition that the first portion of the media stream is classified as uncertain for sending to the receiving user, the technique 500 proceeds to 506; otherwise, the technique 500 proceeds to 516.

At 506, the client-side device (e.g., a blurring module, such as the blurring module 312 of FIG. 3, or a blurring module accessible by the client-side device) blurs the first portion of the media stream to obtain a blurred first portion of the media stream. In an example, the technique 500 may not perform 506 until the process 500 determines that a blurred version of the first portion is to be transmitted to the receiving user. Thus, the blurring can be performed on demand (i.e., when needed). At 508, the client-side device (e.g., a scaling module, such as the scaling module 310 of FIG. 3, or a scaling module that is accessible to by the client-side device) scales the first portion of the media stream to obtain a scaled first portion of the media stream. At 510, the client-side device (e.g., a real-time communications module therein, such as the RTC module 314 of FIG. 3) forwards the scaled first portion of the media stream to the centralized content moderation device. In an example, the scaled first portion can be transmitted to the centralized content moderation device as described with respect to FIG. 3. In an example, the scaled first portion can be transmitted to the centralized content moderation device as described with respect to FIG. 6.

At 512, the user-side device (e.g., the blurring module of the user-side device) receives, from the centralized content moderation device (e.g., from a centralized CM module, such as the centralized CM module 318 of FIG. 3), a centralized determination as to whether the first portion of the media stream is inappropriate. At 514, the client-side device uses the centralized determination to determine whether to transmit the first portion or the blurred first portion to the receiving user. If a blurred first portion has not been yet generated, then at this point, the technique 500 can perform 506.

At 516, if the client-side device (e.g., the local CM module) determines that the first portion of the media stream is appropriate for sending to the receiving user, then, at 518, the client-side device transmits the first portion of the media stream to the receiving user; otherwise the technique 500 proceeds to 520. At 520, the first portion must have been classified as inappropriate. Thus, the technique 500 transmits the first blurred portion to the media stream. Thus, if the blurred first portion is not yet obtained by the technique 500, then the technique 500 can blurs the first portion of the media stream to obtain the blurred first portion of the media stream. Thus, in response to determining that the first portion is inappropriate, the technique 500 blurs the first portion to obtain the blurred first portion; and transmits, to the receiving user, the blurred first portion.

In an example, the user-side content moderation device can scale a second portion of the media stream to obtain a scaled second portion of the media stream and forward the scaled second portion of the media stream to the centralized content moderation device.

In an example, the centralized determination as to whether the first portion of the media stream is inappropriate indicates that the first portion is inappropriate; and the centralized content moderation device can receive, from the sending user, a report that the centralized determination is an erroneous determination. In an example, the centralized determination as to whether the first portion of the media stream is inappropriate indicates that the first portion is appropriate; and the centralized content moderation device can receive, from the receiving user, a report that the centralized determination is an erroneous determination.

In an example, the centralized content moderation device can forward the scaled first portion of the media stream to a human inspector who determines whether the scaled first portion of the media stream is appropriate.

Returning briefly to FIG. 3, in an example, the machine-learning models described with respect to the local CM module 308 and the centralized CM module 318, can each be a deep-learning convolutional neural network (CNN). In a CNN, a feature extraction portion typically includes a set of convolutional operations, which is typically a series of filters that are used to filter an input (e.g., an image) based on a filter (typically a square of size k, without loss of generality). For example, and in the context of machine vision, these filters can be used to find features in an input image. The features can include, for example, edges, corners, endpoints, and so on. As the number of stacked convolutional operations increases, later convolutional operations can find higher-level features.

In the CNN, a classification portion is typically a set of fully connected layers. The fully connected layers can be thought of as looking at all the input features of an image in order to generate a high-level classifier. Several stages (e.g., a series) of high-level classifiers eventually generate the desired classification output.

As mentioned, a typical CNN network is composed of a number of convolutional operations (e.g., the feature-extraction portion) followed by a number of fully connected layers. The number of operations of each type and their respective sizes is typically determined during a training phase of the machine learning. As a person skilled in the art recognizes, additional layers and/or operations can be included in each portion. For example, combinations of Pooling, MaxPooling, Dropout, Activation, Normalization, BatchNormalization, and other operations can be grouped with convolution operations (i.e., in the features-extraction portion) and/or the fully connected operation (i.e., in the classification portion). The fully connected layers may be referred to as Dense operations. As a person skilled in the art recognizes, a convolution operation can use a SeparableConvolution2D or Convolution2D operation.

A convolution layer can be a group of operations starting with a Convolution2D or SeparableConvolution2D operation followed by zero or more operations (e.g., Pooling, Dropout, Activation, Normalization, BatchNormalization, other operations, or a combination thereof), until another convolutional layer, a Dense operation, or the output of the CNN is reached. Similarly, a Dense layer can be a group of operations or layers starting with a Dense operation (i.e., a fully connected layer) followed by zero or more operations (e.g., Pooling, Dropout, Activation, Normalization, BatchNormalization, other operations, or a combination thereof) until another convolution layer, another Dense layer, or the output of the network is reached. The boundary between feature extraction based on convolutional networks and a feature classification using Dense operations can be marked by a Flatten operation, which flattens the multidimensional matrix from the feature extraction into a vector.

In a typical CNN, each of the convolution layers may consist of a set of filters. While a filter is applied to a subset of the input data at a time, the filter is applied across the full input, such as by sweeping over the input. The operations performed by this layer are typically linear/matrix multiplications. The activation function may be a linear function or non-linear function (e.g., a sigmoid function, an arcTan function, a tan H function, a ReLu function, or the like).

Each of the fully connected operations is a linear operation in which every input is connected to every output by a weight. As such, a fully connected layer with N number of inputs and M outputs can have a total of N×M weights. As mentioned above, a Dense operation may be generally followed by a non-linear activation function to generate an output of that layer.

For simplicity of explanation, the techniques 400 and 500 of FIGS. 4 and 5, respectively, are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the client device 306, and/or any of the components therein described with respect to FIG. 3, and/or the centralized CM system 316, and/or any of the components therein described with respect to FIG. 3, (and the techniques, algorithms, methods, instructions, etc., stored thereon and/or executed thereby) can be realized in hardware, software, or any combination thereof. The hardware can include, for example, computers, intellectual property (IP) cores, application-specific integrated circuits (ASIC s), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the client device 306 and the centralized CM system 316 do not necessarily have to be implemented in the same manner.

Further, in one aspect, for example, the client device 306 or the centralized CM system 316 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for content moderation in real-time communication, comprising:
 a memory; and
 a processor, the processor configured to execute instructions stored in the memory to:

receive a first portion of a media stream from a sending user;

determine a classification of the first portion of the media stream, wherein the classification is indicative of an appropriateness of transmission of the first portion to a receiving user, wherein the classification is one of appropriate, inappropriate, or uncertain, and wherein the classification of uncertain indicates that the first portion cannot be determined with sufficient certainty whether the first portion is appropriate or inappropriate;

in response to determining that the first portion is uncertain for transmission to the receiving user, perform instructions to:

transmit, to a centralized content moderation device, the first portion of the media stream, wherein the centralized content moderation device determines a centralized determination of whether the first portion is appropriate; and in response to the centralized determination indicating that the first portion of the media stream is inappropriate:

blur the first portion to obtain a blurred first portion; and transmit, to the receiving user, the blurred first portion; and in response to determining that the first portion is appropriate, transmit the first portion to the receiving user.

2. The apparatus of claim 1, wherein to transmit, to the receiving user, the blurred first portion comprises to:

transmit the blurred first portion to a forwarding device, wherein the forwarding device transmits the blurred first portion to the receiving user.

3. The apparatus of claim 1, wherein the instructions further comprise instructions to:

in response to determining that the first portion is inappropriate:

blur the first portion to obtain the blurred first portion; and transmit, to the receiving user, the blurred first portion.

4. The apparatus of claim 1, wherein the instructions further comprise instructions to:

in response to determining that a second portion of the media stream is not appropriate, determine whether to blur the second portion of the media stream based on the centralized determination, wherein to determine that the second portion of the media stream is not appropriate comprises to:

determine that the second portion of the media stream is inappropriate for transmitting to the receiving user or determine with an uncertainty whether the second portion is appropriate or inappropriate.

5. The apparatus of claim 4, wherein to determine whether to blur the second portion of the media stream based on the centralized determination comprises to:

in response to the centralized determination indicating that the first portion is appropriate, not blur the second portion before transmitting the second portion to the receiving user.

6. The apparatus of claim 4, wherein to determine whether to blur the second portion of the media stream based on the centralized determination comprises to:

in response to the centralized determination indicating that the first portion is inappropriate, blur the second portion before transmitting the second portion to the receiving user.

7. The apparatus of claim 1, wherein the first portion of the media stream comprises a visual portion and an audio portion, and wherein to blur the first portion of the media stream to obtain the blurred first portion comprises to:

blur the visual portion to obtain a blurred visual portion; and distort the audio portion to obtain a distorted audio portion.

8. A system for content moderation in real-time communication, comprising:

a centralized content moderation device; and a user-side content moderation device, the user-side content moderation device configured to:

receive a first portion of a media stream from a sending user;

determine whether the first portion of the media stream is appropriate for sending to a receiving user;

on a first condition that the first portion of the media stream is not determined to be appropriate and the media stream is not determined to be inappropriate for sending to the receiving user:

scale the first portion of the media stream to obtain a scaled first portion of the media stream;

forward the scaled first portion of the media stream to the centralized content moderation device;

receive, from the centralized content moderation device, a centralized determination as to whether the first portion of the media stream is inappropriate; and use the centralized determination to determine whether to transmit the first portion or a blurred first portion of the first portion to the receiving user; and on a second condition that the first portion of the media stream is determined to be appropriate for sending to the receiving user:

transmit the first portion of the media stream to the receiving user.

9. The system of claim 8, wherein the user-side content moderation device is further configured to:

scale a second portion of the media stream to obtain a scaled second portion of the media stream; and forward the scaled second portion of the media stream to the centralized content moderation device.

10. The system of claim 8, wherein the centralized determination as to whether the first portion of the media stream is inappropriate indicates that the first portion is inappropriate, and wherein the centralized content moderation device is further configured to:

receive, from the sending user, a report that the centralized determination is an erroneous determination.

11. The system of claim 8, wherein the centralized determination as to whether the first portion of the media stream is inappropriate indicates that the first portion is appropriate, and wherein the centralized content moderation device is further configured to:

receive, from the receiving user, a report that the centralized determination is an erroneous determination.

12. The system of claim 8, wherein the centralized content moderation device is further configured to:

forward the scaled first portion of the media stream to a human inspector who determines whether the scaled first portion of the media stream is appropriate.

13. A method for content moderation in real-time communication, comprising:
- receiving, by a sending device of a sending user, a first portion of a media stream from the sending user;
- determining, by the sending device, that the first portion of the media stream is classified as uncertain for transmission to a receiving user, wherein a classification of uncertain indicates that the first portion cannot be determined with certainty whether the first portion is appropriate or inappropriate for transmission to the receiving user;
- transmitting, by the sending device to a centralized content moderation device, the first portion of the media stream, wherein the centralized content moderation device determines a centralized determination of whether the first portion is appropriate;
- in response to the centralized determination indicating that the first portion is appropriate, transmitting, by the sending device to the receiving user, the first portion; and
- in response to the centralized determination indicating that the first portion is inappropriate, transmitting, by the sending device to the receiving user, a blurred first portion of the first portion.

14. The method of claim 13, wherein transmitting, by the sending device to the receiving user, the blurred first portion comprises:
- transmitting the blurred first portion to a forwarding device, wherein the forwarding device transmits the blurred first portion to the receiving user.

15. The method of claim 13, wherein determining, by the sending device, that the first portion of the media stream is uncertain for the transmission to the receiving user comprises:
- blurring, by the sending device, the first portion of the media stream to obtain the blurred first portion before transmitting the first portion to the centralized content moderation device.

16. The method of claim 13, further comprising:
- determining whether to blur a second portion of the media stream based on the centralized determination.

17. The method of claim 16, wherein determining whether to blur the second portion of the media stream based on the centralized determination comprises:
- in response to the centralized determination indicating that the first portion is appropriate, not blurring the second portion before transmitting the second portion to the receiving user; and
- in response to the centralized determination indicating that the first portion is inappropriate, blurring the second portion before transmitting the second portion to the receiving user.

18. The method of claim 13, further comprising:
- in response to determining that the first portion of the media stream is appropriate, transmitting, by the sending device, the first portion to the receiving user; and
- in response to determining that the first portion of the media stream is inappropriate, transmitting, to the receiving user, a blurred first portion of the first portion.

19. The method of claim 13, wherein the first portion of the media stream comprises an audio portion, and wherein blurring the first portion of the media stream to obtain the blurred first portion comprises:
- distorting the audio portion to obtain a distorted audio portion.

20. The method of claim 13, wherein the first portion of the media stream comprises a visual portion, and wherein blurring the first portion of the media stream to obtain the blurred first portion comprises:
- blurring the visual portion to obtain a blurred visual portion.

* * * * *